United States Patent [19]

Sommer et al.

[11] 4,024,126
[45] May 17, 1977

[54] ARYL- OR ALKYL-SULPHONYL AMINOSULPHONYLPHENYL-AZO-ARYLENE-AZO-PHENYL DYESTUFFS

[75] Inventors: Richard Sommer, Leverkusen; Gerhard Wolfrum, Opladen, both of Germany

[73] Assignee: Bayer Aktiengesellschaft, Leverkusen, Germany

[22] Filed: July 10, 1972

[21] Appl. No.: 270,010

[30] Foreign Application Priority Data

July 10, 1971 Germany .......................... 2134498

[52] U.S. Cl. ............................. 260/186; 260/174; 260/177; 260/184; 260/191; 260/185; 260/206; 260/208; 260/196; 260/198; 260/205

[51] Int. Cl.² ................... C09B 31/06; C09B 43/18

[58] Field of Search .......... 260/174, 177, 184, 185, 260/186, 191

[56] References Cited

UNITED STATES PATENTS 3,134,766  5/1964  Merian et al. ..................... 260/186
3,310,550  3/1967  Liechti ........................ 260/186 X

FOREIGN PATENTS OR APPLICATIONS 1,925,288  11/1970  Germany ......................... 260/186

Primary Examiner—Charles F. Warren
Attorney, Agent, or Firm—Plumley and Tyner

[57] ABSTRACT

Disazo dyestuffs, which in the form of the free acid, have the formula

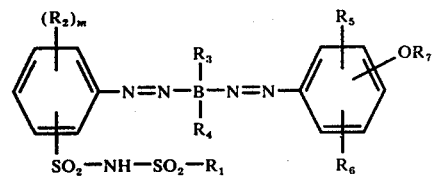

wherein
  $R_1$ is an aromatic radical, an aliphatic radical with 1–4 C atoms or a dialkylamino radical;
  $R_2$ is chlorine, bromine, alkoxy or alkyl;
  $R_3$ and $R_4$ are hydrogen, chlorine, bromine, alkoxy group or alkyl;
  $R_5$ and $R_6$ are hydrogen, $C_1$–$C_4$-alkyl or $C_1$–$C_4$-alkoxy;
  $R_7$ is $C_1$–$C_4$-alkyl;
  B is a 1,4-phenylene, 1,4-naphthylene or tetrahydro-1,4-naphthylene radical; and
  $m$ is 0, 1 or 2;

are disclosed. The resulting dyestuffs are used for the dyeing fibers containing of amide groups, for example those of wool, silk and polyamide, such as poly-ε-caprolactam or the reaction product of hexamethylenediamine with adipic acid. The resulting dyeings, especially those on polyamide materials, are distinguished by good fastness properties, especially by good wet fastness properties and good light fastness properties.

8 Claims, No Drawings

ARYL- OR ALKYL-SULPHONYL AMINOSULPHONYLPHENYL-AZO-ARYLENE-AZO-PHENYL DYESTUFFS

The subject of the present invention are new, valuable diazo dyestuffs which in the form of the free acid correspond to the general formula

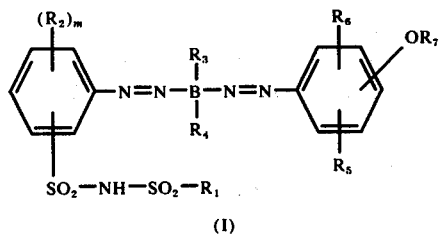

(I)

as well as their manufacture and use for dyeing synthetic fibre materials, especially those of polyamides.

In the general formula (I),
$R_1$ represents an aromatic radical, an aliphatic radical with 1–4 C atoms or a dialkylamino radical,
$R_2$ represents chlorine, bromine, an alkoxy group or an alkyl group,
$R_3$ and $R_4$ represent hydrogen, chlorine, bromine, an alkoxy group or an alkyl group,
$R_5$ and $R_6$ represent hydrogen, an alkyl group with 1–4 C atoms or an alkoxy group with 1–4 C atoms,
$R_7$ represents an alkyl group with 1–4 C atoms,
B represents a 1,4-phenylene, 1,4-naphthylene or tetrahydro-1,4-naphthylene radical and
$m$ represents a number 0 – 2.

The radicals $R_2$ can be identical or different, as can the radicals $R_3$ and $R_4$, or $R_5$ and $R_6$.

Suitable radicals B are, for example, radicals of the formulae

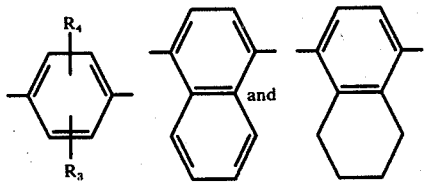

wherein
$R_3$ and $R_4$ have the abovementioned meaning.

Preferred alkyl groups are those with 1–4 C atoms. The alkyl and alkoxy groups can be substituted further, for example by halogen, nitrile, hydroxyl or optionally substituted phenyl. Suitable alkyl groups are, for example, $-CH_3$, $-C_2H_5$, $-C_3H_7$, $-C_4H_9$, $-C_2H_4CN$, $-CH_2-C_6H_5$ or $CF_3$.

Preferred alkoxy groups are those with 1–4 C atoms. Suitable alkoxy groups are, for example, $-OCH_3$, $-OC_2H_5$, $-OCH_7$, $-OC_4H_9$, $-OCH_2CH_2OH$ and $-OCH_2C_6H_5$.

Suitable aromatic radicals $R_1$ are, in particular, phenyl radicals. The phenyl radicals can possess further substituents, for example $C_1$–$C_4$-alkyl groups, $C_1$–$C_4$-alkoxy groups, halogen, nitrile, nitro and the like. Preferred phenyl radicals are phenyl and methylphenyl.

Suitable dialkylamino radicals are, for example, dimethylamino and diethylamino.

The disulphimide group of the formula (I) is in the ortho-, meta- or para-position to the azo bridge and the radical $OR_7$ is in the ortho- or para-position to the azo bridge.

Preferred dyestuffs are those of the formula

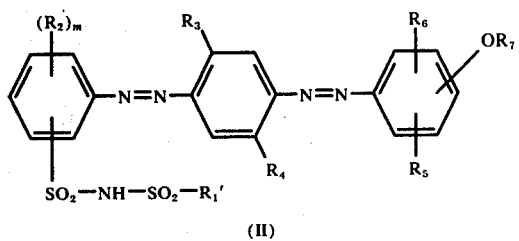

(II)

wherein
$R_2$, $R_3$, $R_4$, $R_5$, $R_6$, $R_7$ and $m$ have the abovementioned meaning and
$R_1'$ represents an aromatic radical or an aliphatic radical with 1–4 C atoms,
and those of the formula

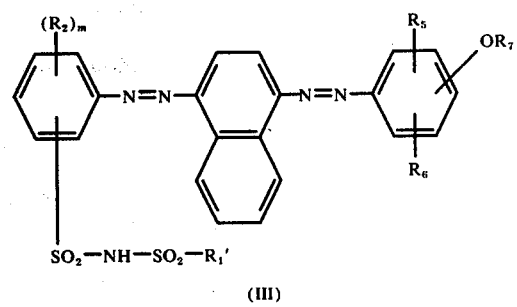

(III)

wherein
$R_1'$, $R_2$, $R_5$, $R_6$, $R_7$ and m have the abovementioned meaning.

Further preferred dyestuffs are those of the formula

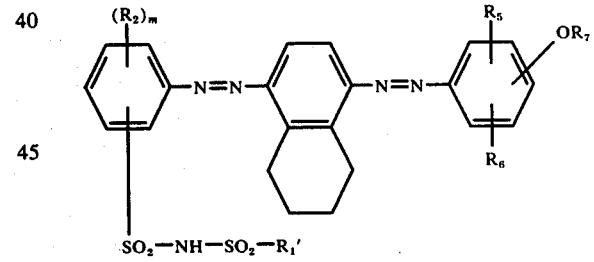

(IV)

wherein
$R_1'$, $R_2$, $R_5$, $R_6$, $R_7$ and m have the abovementioned meaning.

Particularly valuable dyestuffs are those of the formula

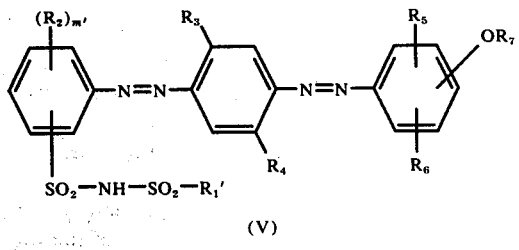

(V)

wherein $R_1'$, $R_2$, $R_3$, $R_4$, $R_5$, $R_6$ and $R_7$ have the abovementioned meaning and $m'$ represents 0 or 1, especially those of the formula

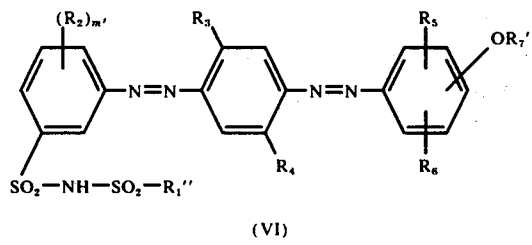

(VI)

wherein $R_2$, $R_3$, $R_4$, $R_5$, $R_6$ and $R_7$ have the abovementioned meaning and $R_1''$ represents an optionally substituted phenyl radical or an aliphatic radical with 1–4 C atoms, $R_7'$ represents a methyl or ethyl group and $m'$ represents 0 or 1.

Further particularly valuable dyestuffs are those of the formula

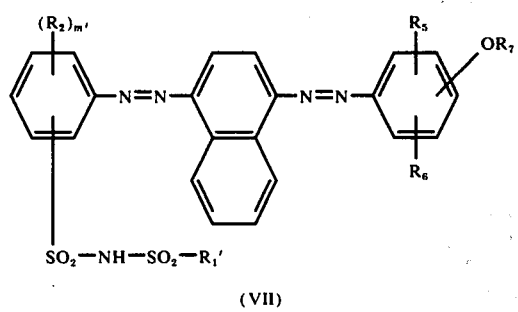

(VII)

wherein $R_1'$, $R_2$, $R_5$, $R_6$ and $R_7$ have the abovementioned meaning and $m'$ represents 0 or 1, especially those of the formula

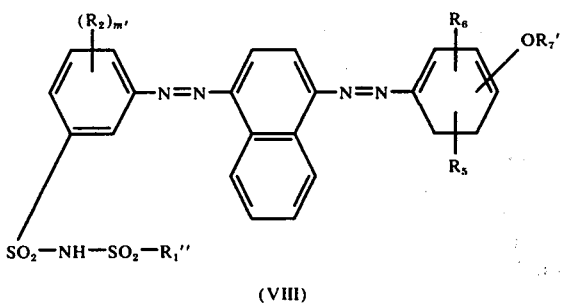

(VIII)

wherein $R_2$, $R_5$ and $R_6$ have the abovementioned meaning and $R_1''$ represents an optionally substituted phenyl radical or an aliphatic radical with 1–4 C atoms, $R_7'$ represents a methyl or ethyl group and $m'$ represents 0 or 1.

The dyestuffs of the formula (I) are manufactured in a known manner, by diazotising amines of the formula

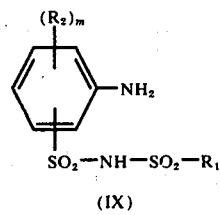

(IX)

wherein $R_1$, $R_2$ and m have the abovementioned meaning, and reacting the product with amines of the formula

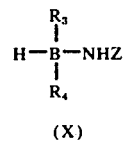

(X)

wherein $R_3$, $R_4$ and B have the abovementioned meaning and Z represents H, —$SO_3H$ or —$CH_2SO_3H$, to give monoazo dyestuffs of the formula

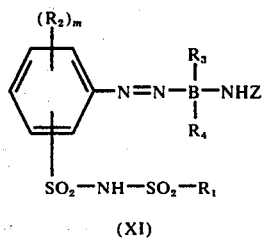

(XI)

diazotising the monoazo dyestuffs thus obtained, after splitting off the group Z by alkaline or acid saponification if necessary, coupling the product with phenols which couple in the ortho- or para-position to the OH group, of the formula

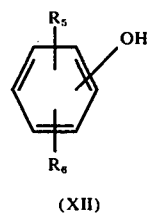

(XII)

wherein $R_5$ and $R_6$ have the abovementioned meaning, and subsequently alkylating the diazo dyestuffs of the formula

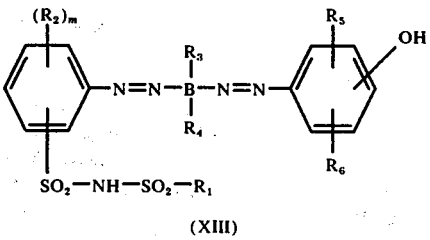

(XIII)

with alkylating agents which introduce 1–4 C atoms.

As suitable disulphimides of the formula (IX) there may for example be mentioned (3-amino-benzenesulphonyl)-benzenesulphonamide, (3-amino-4-chloro-benzenesulphonyl)-benzenesulphonamide, (3-amino-benzenesulphonyl)-methanesulphonamide, (3-amino-benzenesulphonyl)-propanesulphonamide, (3-amino-benzenesulphonyl)-butanesulphonamide, (3-amino-benzenesulphonyl)-p-toluenesulphonamide, (3-amino-benzenesulphonyl)-o-toluenesulphonamide, (3-amino-4-chloro-benzenesulphonyl)-p-toluenesulphonamide, (3-amino-4-chloro-benzenesulphonyl)-methanesulphonamide, (3-amino-4-chloro-benzenesulphonyl)-butanesulphonamide, (3-amino-4-chloro-benzenesulphonyl)-o-toluenesulphonamide, (3-amino-6-methyl-benzenesulphonyl)-benzenesulphonamide, (3-amino-6-methyl-benzenesulphonyl)-butanesulphonamide, (3-amino-6-methyl-benzenesulphonyl)-methanesulphonamide, (3-amino-6-methyl-benzenesulphonyl)-p-toluenesulphonamide, (3-amino-6-methyl-benzenesulphonyl)-o-toluenesulphonamide, (3-amino-4-methyl-benzenesulphonyl)-benzenesulphonamide, (3-amino-4-methyl-benzenesulphonyl)-p-toluenesulphonamide, (3-amino-4-methyl-benzenesulphonyl)-o-toluenesulphonamide, (3-amino-4-methyl-benzenesulphonyl)-methanesulphonamide, (3-amino-4-methoxy-benzenesulphonyl)-benzenesulphonamide, (3-amino-4-methoxy-benzenesulphonyl)-p-toluenesulphonamide, (3-amino-4-methoxy-benzenesulphonyl)-methanesulphonamide, (3-amino-4-methoxy-benzenesulphonyl)-butanesulphonamide, (3-amino-6-methoxy-benzenesulphonyl)-benzenesulphonamide, (3-amino-6-methoxy-benzenesulphonyl)-p-toluenesulphonamide, (3-amino-6-methoxy-benzenesulphonyl)-methanesulphonamide, (3-amino-6-methoxy-benzenesulphonyl)-butanesulphonamide, (2-amino-benzenesulphonyl)-benzenesulphonamide, (2-amino-benzenesulphonyl)-p-toluenesulphonamide, (2-amino-benzenesulphonyl)-o-toluenesulphonamide, (2-amino-benzenesulphonyl)-methanesulphonamide, (2-amino-benzenesulphonyl)-butanesulphonamide, (3-amino-6-ethyl-benzenesulphonyl)-benzenesulphonamide, (3-amino-6-ethyl-benzenesulphonyl)-p-toluenesulphonamide, (3-amino-6-ethyl-benzenesulphonyl)-methanesulphonamide, (3-amino-4-ethyl-benzenesulphonyl)-benzenesulphonamide, (3-amino-6-ethoxy-benzenesulphonyl)-benzenesulphonamide, (3-amino-6-ethoxy-benzenesulphonyl)-p-toluenesulphonamide, (3-amino-6-chloro-benzenesulphonyl)-benzenesulphonamide, (3-amino-6-chloro-benzenesulphonyl)-p-toluenesulphonamide, (3-amino-6-chloro-benzenesulphonyl)-o-toluenesulphonamide, (4-amino-benzenesulphonyl)-p-toluenesulphonamide, (4-amino-benzenesulphonyl)-o-toluenesulphonamide, (4-amino-benzenesulphonyl)-methanesulphonamide, (4-amino-benzenesulphonyl)-butanesulphonamide, (3-amino-4-bromo-benzenesulphonyl)-benzenesulphonamide, (3-amino-4-bromo-benzenesulphonyl)-p-toluene-sulphonamide, (3-amino-4-bromo-benzenesulphonyl)-o-toluenesulphonamide, (3-amino-4-bromo-benzenesulphonyl)-methanesulphonamide, (3-amino-4-bromo-benzenesulphonyl)-butanesulphonamide, (2-amino-3-chloro-4-methyl-benzenesulphonyl)-benzenesulphonamide, (2-amino-3-chloro-4-methoxy-benzenesulphonyl)-benzenesulphonamide, (3-amino-4-chloro-5-methyl-benzenesulphonyl)-benzenesulphonamide, (3-amino-5-chloro-6-methyl-benzenesulphonyl)-benzenesulphonamide, (3-amino-5-chloro-6-methyl-benzenesulphonyl)-methanesulphonamide, (4-amino-5-chloro-benzenesulphonyl)-benzenesulphonamide, (4-amino-3-chloro-benzenesulphonyl)-methanesulphonamide, (4-amino-5-methyl-benzenesulphonyl)-methanesulphonamide and (4-amino-5-methyl-benzenesulphonyl)-benzenesulphonamide. (3-Amino-benzenesulphonyl)-dimethylsulphamic acid amide. (4-Amino-benzenesulphonyl)-dimethylsulphamic acid amide. (2-Amino-benzenesulphonyl)-dimethylsulphamic acid amide. (3-Amino-benzenesulphonyl)-diethylsulphamic acid amide. (4-Amino-benzenesulphonyl)-diethylsulphamic acid amide. (2-Amino-benzenesulphonyl)-diethylsulphamic acid amide.

Suitable middle components of the formula (X) are, for example: aniline, 2-aminotoluene, 3-aminotoluene, 2-aminoethylbenzene, 3-amino-ethylbenzene, 3-chloroaniline, 3-bromoaniline, 2-aminoanisole, 3-aminoanisole, 2-amino-ethoxybenzene, 3-amino-ethoxybenzene, 1-amino-2,3-dimethylbenzene, 1-amino-2,5-dimethylbenzene, 1-amino-3,5-dimethylbenzene, 3-amino-4-methoxy-toluene, 2-amino-4-methoxy-toluene, 2-amino-1,4-dimethoxy-benzene, 2-amino-4-ethoxy-toluene, 2-amino-1,4-diethoxy-benzene, α-naphthylamine, 5,6,7,8-tetrahydro-1-naphthylamine or their N-sulphonic acids or their N-ω-methanesulphonic acids.

As suitable end components of the formula (XII) there may for example be mentioned: phenol, o-cresol, m-cresol, p-cresol, 1-hydroxy-4-ethylbenzene, 1-hydroxy-4-tertiary butylbenzene, 1-hydroxy-2-ethylbenzene, 1-hydroxy-2-isopropylbenzene, 1-hydroxy-2-secondary butyl-benzene, 3-hydroxy-1,2-dimethyl-benzene, 2-hydroxy-1,4-dimethyl-benzene, 4-hydroxy-1,2-dimethyl-benzene, 2-hydroxy-1,3-diethyl-benzene, 1-hydroxy-2-methoxy-benzene, 1-hydroxy-3-methoxy-benzene, 1-hydroxy-3-ethoxy-benzene, 1-hydroxy-4-butoxy-benzene and 1-hydroxy-3-butoxy-benzene.

As suitable alkylating agents there may, for example, be mentioned: dimethyl sulphate, diethyl sulphate, methyl chloride, methyl iodide, ethyl chloride, propyl bromide, isopropyl bromide, butyl iodide and benzyl bromide.

The amines of the formula (IX) are diazotised in accordance with methods which are in themselves known, preferably by means of sodium nitrite in aqueous solution containing mineral acid. The coupling of the diazonium compounds of the amines of the formula (IX) with the coupling components of the formula (X) can be carried out in accordance with processes which are in themselves known, for example in a neutral to strongly acid, but preferably in a weakly acid, pH range, in an aqueous or aqueous-organic medium.

The monoazo dyestuffs of the formula (XI) are isolated in accordance with known methods, for example by filtration or by salting-out with a salt which is soluble in aqueous solution, for example with NaCl or KCl, and subsequent filtration. If coupling components of the formula (X) with $Z = SO_3H$ or $-CH_2-SO_3H$ are employed, an isolation of the monoazo dyestuffs is frequently only necessary after the amino group of the coupling component has been liberated by alkaline or acid saponification. An intermediate isolation of the monoazo dyestuffs is, however, not always necessary — they can also be further diazotised without isolation.

The further diazotisation of the aminoazo dyestuffs (XI) with $Z = H$ can, for example, be carried out in an acid, aqueous dispersion with sodium nitrite solution, in which case the diazotisation temperatures can be between 0° and 30° C. Aminoazo dyestuffs of the formula (XI) with Z = H can furthermore also be diazotised indirectly by dissolving them by means of alkali, adding sodium nitrite solution and pouring the mixture into aqueous hydrochloric acid, or adding hydrochloric acid.

The coupling of the diazotised aminoazo dyestuffs (XI) with the end components (XII) to give the disazo dyestuffs (XIII) is also carried out in the usual manner, preferably in an aqueous-alkaline medium. The disazo dyestuffs of the formula (XIII) can be isolated by simply filtering them off, if appropriate after addition of sodium chloride. If the dyestuffs are obtained in an impure form, they can be recrystallised in a known manner from hot water, if necessary with addition of alkali.

The reaction of the disazo dyestuffs (XIII) with the alkylating agents to give the dyestuffs (I) takes place in the customary manner, for example in an aqueous-alkaline medium.

The more sparingly soluble dyestuffs (I) can be rendered easily soluble in water by mixing them with salts of strong bases and weak acids, for example trisodium phosphate, disodium hydrogen phosphate, sodium tetraborate, sodium metaphosphate, sodium metasilicate or sodium carbonate.

The new dyestuffs of the formula (I) can be isolated in the form of the free acid or as alkali metal salts or ammonium salts, and exist in these forms and/or be used further in these forms. Suitable alkali metal salts in which the hydrogen atom of the NH group is thus replaced by an alkali metal cation are, for example, the sodium or potassium salts.

The new dyestuffs are particularly suitable for dyeing and printing natural and synthetic fibre materials containing amide groups, for example those of wool, silk and polyamide, such as poly-ε-caprolactam or the reaction product of hexamethylenediamine with adipic acid. The resulting dyeings, especially those on polyamide materials, are distinguished by good fastness properties, especially by good wet fastness properties and good light fastness properties. The neutral affinity and the combination behaviour with other suitable dyestuffs for this material is also good. The dyestuffs of the formula (I) are employed for dyeing neither in the form of the free acid (>NH) or as an alkali salt or as an ammonium salt.

In the examples which follow, parts denote parts by weight and percentages denote percentages by weight.

EXAMPLE 1

31.2 parts of (3-amino-benzenesulphonyl)-benzenesulphonamide are dissolved in 200 parts of water with the addition of 10% strength sodium hydroxide solution and 7.0 parts of sodium nitrite are added. The solution thus obtained is run into 200 parts of ice/H$_2$O and 35 parts of concentrated hydrochloric acid and diazotised over the course of 0.5 hour at 0° – 5° C; thereafter the excess of nitrous acid is removed with amidosulphonic acid and the diazonium salt suspension is run, at 0° – 5° C, into a solution of 20.5 parts of anilino-methanesulphonic acid and 9 parts of sodium bicarbonate in 100 parts of water, and the pH is kept at between 5 and 7 by further addition of sodium bicarbonate. After completion of coupling, the product is salted-out with sodium chloride, filtered off and washed with saturated sodium chloride solution. The moist dyestuff paste is stirred in 200 parts of 7% strength sodium hydroxide solution for 1 hour at 80° – 90° C. After completion of splitting off of the sulphomethyl group, the dyestuff is precipitated by adding sodium chloride, filtered off and washed with saturated sodium chloride solution.

The aminoazo dyestuff thus obtained is dissolved in 500 parts of water, 7.0 parts of sodium nitrite are added and the dyestuff is diazotised by pouring into 1,000 parts of water and 30 parts of concentrated hydrochloric acid over the course of 30 minutes at 10° – 20° C, after which the excess nitrous acid is destroyed with amidosulphonic acid. The diazonium salt suspension thus obtained is stirred into a solution of 9.5 parts of phenol and 4 parts of sodium hydroxide in 200 parts of water at 10° – 20° C and the pH is kept at between 8 and 9 by adding 10% strength sodium hydroxide solution. After completion of coupling, the disazo dyestuff is filtered off and dissolved in 500 ml of water at pH 10.5 by adding concentrated sodium hydroxide solution, and 50 ml of dimethyl sulphate are added dropwise at 45° C. The pH-value is kept at 10 – 10.5 by simultaneous dropwise addition of concentrated sodium hydroxide solution. The mixture is stirred for a further 30 minutes and the dyestuff which has precipitated is filtered off, washed with sodium chloride solution and dried in vacuo at 50° C. In the form of the free acid, the dyestuff corresponds to the formula

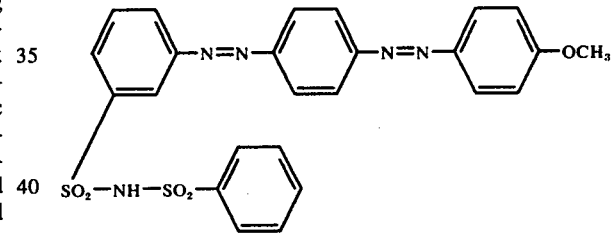

It dyes polyamide, from a weakly acid or neutral bath, in yellow shades having good fastness properties.

DYEING EXAMPLE 0.1 g of the dyestuff is dissolved in 100 ml of hot water, 5 ml of 10% strength ammonium acetate solution are added and the whole is diluted to a volume of 500 ml with water. 10 g of polyamide fibre are introduced into the dyebath, the dyebath is brought to the boil over the course of 20 minutes, 4 ml of 10% strength acetic acid are added and the whole is kept at the boil for one hour. Thereafter the goods are rinsed and dried at 70° – 80° C.

If the procedure indicated in the preceding example is followed and the starting components, middle components and end components listed in the table which follows are used, with dimethyl sulphate as the alkylating agent, further disazo dyestuffs of the general formula (I) are obtained, which dye polyamide in yellow to red shades.

| Example | Starting Component | Middle Component | End Component |
| --- | --- | --- | --- |
| 2 | (3-Amino-benzenesulphonyl)-(benzenesulphonamide | Aniline | o-Cresol |

-continued

| Example | Starting Component | Middle Component | End Component |
|---|---|---|---|
| 3 | " | " | m-Cresol |
| 4 | " | " | p-Cresol |
| 5 | " | " | 3-Methoxy-phenol |
| 6 | " | " | 1-Hydroxy-2-ethyl-benzene |
| 7 | " | " | 2-Hydroxy-1,3-dimethyl-benzene |
| 8 | " | " | 2-Hydroxy-1,4-dimethyl-benzene |
| 9 | " | 3-Amino-toluene | Phenol |
| 10 | " | " | o-Cresol |
| 11 | " | " | p-Cresol |
| 12 | " | " | 1-Hydroxy-4-ethyl-benzene |
| 13 | " | " | 1-Hydroxy-3-ethoxy-benzene |
| 14 | " | " | 4-Hydroxy-1,2-dimethyl-benzene |
| 15 | " | 3-Amino-4-methoxy-toluene | Phenol |
| 16 | " | " | o-Cresol |
| 17 | " | " | 4-tert.-Butyl-phenol |
| 18 | " | " | m-Cresol |
| 19 | " | " | 3-Methoxy-phenol |
| 20 | " | " | 3-Ethoxy-phenol |
| 21 | " | " | 2-Hydroxy-1,4-dimethyl-benzene |
| 22 | " | " | 3-Hydroxy-1,2-dimethyl-benzene |
| 23 | " | " | p-Cresol |
| 24 | " | 3-Amino-anisole | Phenol |
| 25 | " | " | o-Cresol |
| 26 | " | " | p-Cresol |
| 27 | " | " | m-Cresol |
| 28 | " | " | 4-tert.-Butyl-phenol |
| 29 | " | " | 3-Methoxy-phenol |
| 30 | " | " | 2-Methoxy-phenol |
| 31 | " | " | 2-Hydroxy-1,4-dimethyl-benzene |
| 32 | " | 2-Amino-toluene | Phenol |
| 33 | " | " | o-Cresol |
| 34 | " | " | p-Cresol |
| 35 | " | " | 4-Ethyl-phenol |
| 36 | " | " | 4-Hydroxy-1,2-dimethyl-benzene |
| 37 | " | " | 3-Methoxy-phenol |
| 38 | " | " | 3-Ethoxy-phenol |
| 39 | " | " | 2-Isopropyl-phenol |
| 40 | " | " | 2-Hydroxy-1,3-diethyl-benzene |
| 41 | " | 3-Amino-ethylbenzene | Phenol |
| 42 | " | " | o-Cresol |
| 43 | " | " | p-Cresol |
| 44 | " | " | 4-Hydroxy-1,2-dimethyl-benzene |
| 45 | " | " | 3-Methoxy-phenol |
| 46 | " | " | 4-tert.-Butyl-phenol |
| 47 | " | 2-Amino-ethylbenzene | Phenol |
| 48 | " | " | p-Cresol |
| 49 | " | " | o-Cresol |
| 50 | " | " | 4-Ethyl-phenol |
| 51 | " | " | 2-Methox-phenol |
| 52 | " | 2-Amino-anisole | Phenol |
| 53 | " | " | o-Cresol |
| 54 | " | " | p-Cresol |
| 55 | " | " | 3-Methoxy-phenol |
| 56 | " | " | 4-Butoxy-phenol |
| 57 | " | " | 2-Isopropyl-phenol |
| 58 | " | 3-Bromo-aniline | Phenol |
| 59 | " | " | m-Cresol |
| 60 | " | " | 4-Ethyl-phenol |
| 61 | " | " | 2-Hydroxy-1,4-dimethyl-benzene |
| 62 | " | 3-Amino-ethoxy-benzene | Phenol |
| 63 | " | " | o-Cresol |
| 64 | " | " | 4-tert.-Butyl-phenol |
| 65 | " | " | 3-Methoxy-phenol |
| 66 | " | " | 2-Methoxy-phenol |
| 67 | " | 3-Chloro-aniline | Phenol |
| 68 | " | " | p-Cresol |
| 69 | " | " | 2-secondary-Butyl-phenol |
| 70 | " | " | 4-Ethyl-phenol |
| 71 | " | 1-Amino-2,3-dimethyl-benzene | Phenol |
| 72 | " | " | m-Cresol |
| 73 | " | " | p-Cresol |
| 74 | " | " | 4-Ethyl-phenol |
| 75 | " | " | 3-Hydroxy-1,2-dimethyl-benzene |
| 76 | " | 2-Amino-4-methoxy-toluene | Phenol |
| 77 | " | " | o-Cresol |
| 78 | " | " | 4-tert.-Butyl-phenol |
| 79 | " | " | 3-Methoxy-phenol |
| 80 | (3-Amino-benzenesulphonyl)-benzenesulphonamide | 2-Amino-1,4-dimethoxy-benzene | Phenol |
| 81 | " | " | o-Cresol |
| 82 | " | " | p-Cresol |
| 83 | " | " | 4-Ethyl-phenol |
| 84 | " | " | 4-Hydroxy-1,2-dimethyl-benzene |
| 85 | " | 1-Amino-2,5-dimethyl-benzene | Phenol |
| 86 | " | " | m-Cresol |
| 87 | " | " | 4-Ethyl-phenol |
| 88 | " | " | 3-Methoxy-phenol |
| 89 | " | " | 2-Hydroxy-1,4-dimethyl-phenol |
| 90 | " | 2-Amino-4-ethoxy-toluene | Phenol |

-continued

| Example | Starting Component | Middle Component | End Component |
|---|---|---|---|
| 91 | '' | '' | m-Cresol |
| 92 | '' | '' | p-Cresol |
| 93 | '' | '' | 3-Ethoxy-phenol |
| 94 | '' | '' | 2-Ethyl-phenol |
| 95 | '' | 2-Amino-1,4-diethoxy-benzene | Phenol |
| 96 | '' | '' | 4-Ethyl-phenol |
| 97 | '' | '' | 4-tert.-Butyl-phenol |
| 98 | '' | α-Naphthylamine | p-Cresol |
| 99 | '' | '' | o-Cresol |
| 100 | '' | '' | Phenol |
| 101 | '' | '' | 3-Methoxy-phenol |
| 102 | '' | '' | 4-Ethyl-phenol |
| 103 | '' | '' | 4-tert.-Butyl-phenol |
| 104 | '' | '' | 2-Hydroxy-1,4-dimethyl-benzene |
| 105 | '' | '' | 2-Hydroxy-1,3-diethyl-benzene |
| 106 | '' | 5,6,7,8-Tetrahydro-1-naphthylamine | Phenol |
| 107 | '' | '' | o-Cresol |
| 108 | '' | '' | p-Cresol |
| 109 | '' | '' | 4-Ethyo-phenol |
| 110 | '' | '' | 3-Methoxy-phenol |

Dyestuffs with similarly good properties and similar shades are obtained if the middle components and end components used in Examples 1–110, and dimethyl sulphate as the alkylating agent, are employed, whilst the following (amino-benzenesulphonyl)-sulphonamides are employed as starting components: (3-amino-benzenesulphonyl)-methanesulphonamide, (3-amino-benzenesulphonyl)-propanesulphonamide, (3-amino-benzenesulphonyl)-butanesulphonamide, (3-amino-benzenesulphonyl)-p-toluenesulphonamide, (3-amino-benzenesulphonyl)-o-toluenesulphonamide, (3-amino-4-chloro-benzenesulphonyl)-p-toluenesulphonamide, (3-amino-4-chloro-benzenesulphonyl)-butanesulphonamide, (3-amino-6-methyl-benzenesulphonyl)-benzenesulphonamide, (3-amino-6-methyl-benzenesulphonyl)-butanesulphonamide, (3-amino-6-methyl-benzenesulphonyl)-methanesulphonamide, (3-amino-6-methyl-benzenesulphonyl)-p-toluenesulphonamide, (3-amino-6-methyl-benzenesulphonyl)-o-toluenesulphonamide, (3-amino-4-methyl-benzenesulphonyl)-benzenesulphonamide, (3-amino-4-methyl-benzenesulphonyl)-p-toluenesulphonamide, (3-amino-4-methyl-benzenesulphonyl)-o-toluenesulphonamide, (3-amino-4-methyl-benzenesulphonyl)-methanesulphonamide, (3-amino-4-methoxy-benzenesulphonyl)-benzenesulphonamide, (3-amino-4-methoxy-benzenesulphonyl)-p-toluenesulphonamide, (3-amino-4-methoxy-benzenesulphonyl)-methanesulphonamide, (3-amino-4-methoxy-benzenesulphonyl)-butanesulphonamide, (3-amino-6-methoxy-benzenesulphonyl)-benzenesulphonamide, (3-amino-6-methoxy-benzenesulphonyl)-p-toluenesulphonamide, (3-amino-6-methoxy-benzenesulphonyl)-butanesulphonamide, (2-amino-benzenesulphonyl)-benzenesulphonamide, (2-amino-benzenesulphonyl)-p-toluenesulphonamide, (2-amino-benzenesulphonyl)-o-toluenesulphonamide, (2-amino-benzenesulphonyl)-methanesulphonamide, (2-amino-benzenesulphonyl)-butanesulphonamide, (3-amino-6-ethyl-benzenesulphonyl)-benzenesulphonamide, (3-amino-6-ethyl-benzenesulphonyl)-p-toluenesulphonamide, (3-amino-6-ethyl-benzenesulphonyl)-methanesulphonamide, (3-amino-4-ethyl-benzenesulphonyl)-benzenesulphonamide, (3-amino-6-ethoxy-benzenesulphonyl)-benzenesulphonamide, (3-amino-6-ethoxy-benzenesulphonyl)-p-toluenesulphonamide, (3-amino-6-chloro-benzenesulphonyl)-benzenesulphonamide, (3-amino-6-chloro-benzenesulphonyl)-p-toluenesulphonamide, (3-amino-6-chloro-benzenesulphonyl)-o-toluenesulphonamide, (4-amino-benzenesulphonyl)-p-toluenesulphonamide, (4-amino-benzenesulphonyl)-o-toluenesulphonamide, (4-amino-benzenesulphonyl)-methanesulphonamide, (4-amino-benzenesulphonyl)-butanesulphonamide, (3-amino-4-bromo-benzenesulphonyl)-benzenesulphonamide, (3-amino-4-bromo-benzenesulphonyl)-p-toluenesulphonamide, (3-amino-4-bromo-benzenesulphonyl)-o-toluenesulphonamide, (3-amino-4-bromo-benzenesulphonyl)-methanesulphonamide, (3-amino-4-bromo-benzenesulphonyl)-butanesulphonamide, (2-amino-3-chloro-4-methyl-benzenesulphonyl)-benzenesulphonamide, (2-amino-3-chloro-4-methoxy-benzenesulphonyl)-benzenesulphonamide, (3-amino-4-chloro-5-methyl-benzenesulphonyl)-benzenesulphonamide, (3-amino-5-chloro-6-methyl-benzenesulphonyl)-benzenesulphonamide, (3-amino-5-chloro-6-methyl-benzenesulphonyl)-methanesulphonamide, (4-amino-5-chloro-benzenesulphonyl)-benzenesulphonamide, (4-amino-3-chloro-benzenesulphonyl)-methanesulphonamide, (4-amino-5-methyl-benzenesulphonyl)-methanesulphonamide, (4-amino-5-methyl-benzenesulphonyl)-benzenesulphonamide, (3-amino-4-chloro-benzenesulphonyl)-o-toluenesulphonamide, and (3-amino-4-chloro-benzenesulphonyl)-benzenesulphonamide. (3-Amino-benzenesulphonyl)-dimethylsulfamic acid amide. (4-Amino-benzenesulphonyl)-dimethylsulphamic acid amide. (2-Amino-benzenesulphonyl)-dimethylsulphamic acid amide. (3-Amino-benzenesulphonyl)-diethylsulphamic acid amide. (4-Amino-benzenesulphonyl)-diethylsulphamic acid amide. (2-Amino-benzenesulphonyl)-diethylsulphamic acid amide.

Identical dyestuffs are obtained on using methyl chloride, methyl bromide or methyl iodide as alkylating agents. Corresponding dyestuffs are obtained with diethyl sulphate, ethyl chloride, ethyl bromide, ethyl iodide, propyl chloride, propyl bromide, butyl chloride, 2-chloroethanol, ethylene oxide or butyl bromide as alkylating agents.

As examples of dyestuffs manufactured in this way there may be mentioned:

| | Colour Shade on Polyamide |
|---|---|
| Example 111 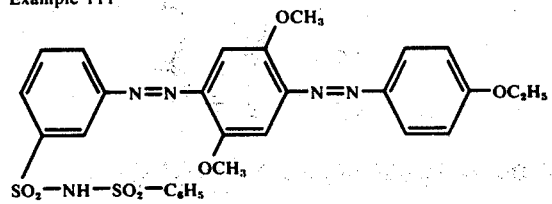 | orange |
| Example 112 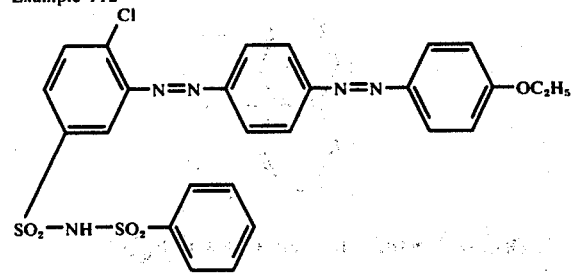 | yellow |
| Example 113 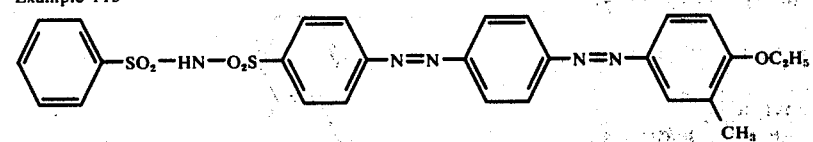 | scarlet |
| Example 114 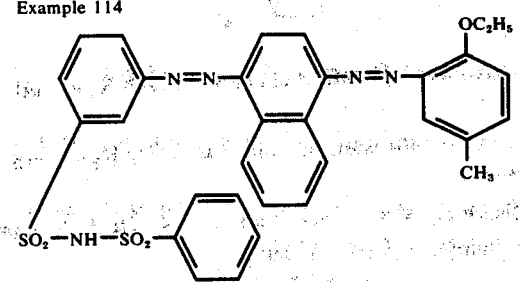 | orange |
| Example 115 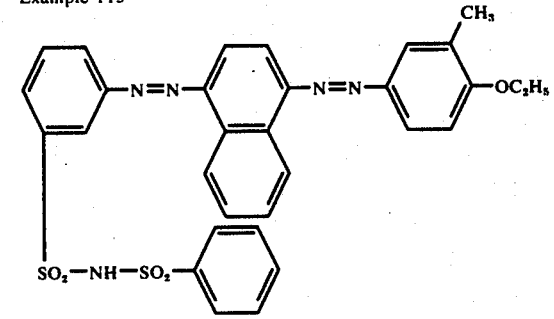 | orange |
| Example 116 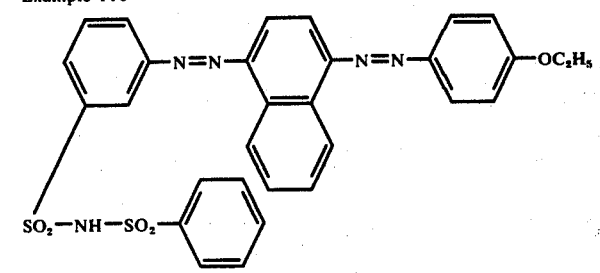 | orange |
We claim:
1. Disazo dyestuff, which in the form of the free acid, has the formula

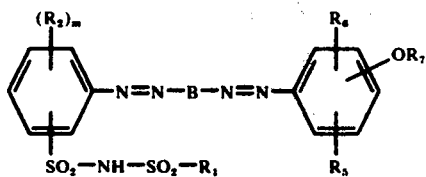

B is

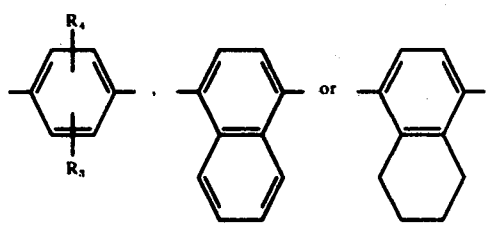

$R_1$ is phenyl; phenyl substituted by $C_1$–$C_4$-alkyl, $C_1$–$C_4$-alkoxy, halogen, cyano or nitro; or $C_1$–$C_4$-alkyl;

$R_2$ is chlorine, bromine, methoxy, ethoxy, methyl or ethyl;

$R_3$ is hydrogen, chlorine, methyl, methoxy, ethyl or ethoxy;

$R_4$ is hydrogen, methyl, methoxy, ethyl or ethoxy;

$R_5$ and $R_6$ independently of one another are hydrogen, $C_1$–$C_4$-alkyl or $C_1$–$C_4$-alkoxy;

$R_7$ is $C_1$–$C_4$-alkyl; and $m$ is 0 or 1.

2. Disazo dyestuff of claim 1 in which B is

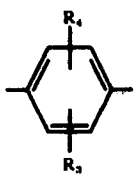

3. Disazo dyestuff of claim 1 in which B is

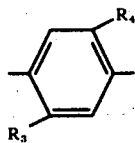

4. Disazo dyestuff of claim 1 in which B is

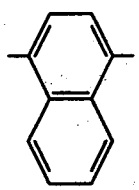

5. Disazo dyestuff of claim 1 in which B is

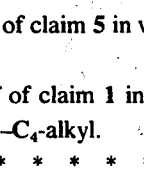

6. Disazo dyestuff of claim 4 in which $R_7$ is methyl or ethyl.

7. Disazo dyestuff of claim 5 in which $R_7$ is methyl or ethyl.

8. Disazo dyestuff of claim 1 in which $R_1$ is phenyl, methylphenyl, or $C_1$–$C_4$-alkyl.

* * * * *